United States Patent [19]

Rider

[11] Patent Number: 4,537,106
[45] Date of Patent: Aug. 27, 1985

[54] STAND FOR DISPENSING FILAMENTARY MATERIAL FROM REELS

[76] Inventor: Earle B. Rider, 80 Galaxy Blvd., Rexdale, Ontario, Canada, M9W 4Y8

[21] Appl. No.: 524,539

[22] Filed: Aug. 19, 1983

[51] Int. Cl.³ .............................................. B65H 49/22
[52] U.S. Cl. ....................................... 83/650; 83/522; 242/129.5; 242/129.62
[58] Field of Search ................................. 83/648–650, 83/651.1; 242/129.5, 134, 129.62, 136, 139, 55.3, 68.7, 78.7; 225/34, 36, 37, 38; 33/129, 134 R

[56] References Cited

U.S. PATENT DOCUMENTS

| | | | |
|---|---|---|---|
| 834,790 | 10/1906 | Wolford | 83/649 |
| 1,447,594 | 3/1923 | Mackrodt | 83/650 |
| 1,562,171 | 11/1925 | Hoornbeek | 242/137.1 |
| 1,848,744 | 3/1932 | Pavlas | 242/129.6 |
| 1,927,976 | 9/1933 | Evans | 83/649 |
| 2,841,343 | 7/1958 | Dorman | 242/129.6 |
| 3,131,479 | 5/1964 | Somogye, Jr. | 33/129 |
| 3,156,391 | 11/1964 | Wicksall | 225/34 |
| 3,383,071 | 5/1968 | Godson | 242/129.6 |
| 3,411,735 | 11/1968 | Hurd | 242/129.62 |
| 3,485,458 | 12/1969 | Evans | 242/129 |
| 3,696,697 | 10/1972 | Hoffman | 83/649 |
| 4,206,885 | 6/1980 | Salvino | 242/68.7 |
| 4,246,817 | 1/1981 | Marsh et al. | 83/455 |

Primary Examiner—Frank T. Yost
Assistant Examiner—Hien H. Phan
Attorney, Agent, or Firm—Ridout & Maybee

[57] ABSTRACT

A display and dispensing rack is disclosed in which reels of filamentary material are rotatably supported upon a pair of roller covered, spaced, parallel bars so that the filamentary material may be withdrawn therefrom, passed through a measuring device and cut to length. Different size reels may be accommodated and reels may be removed and replaced without disturbing adjacent reels.

1 Claim, 5 Drawing Figures

STAND FOR DISPENSING FILAMENTARY MATERIAL FROM REELS

FIELD OF THE INVENTION

The present invention relates to a display and dispensing rack for reels of filamentary material.

BACKGROUND OF THE INVENTION

In the prior art, racks for displaying and dispensing filamentary material commonly consist of frame members which support one or more horizontal axles upon which are rotatably mounted a plurality of reels carrying the filamentary material to be displayed and dispensed.

It is to be understood that in this specification and in the appended claims, the term "filamentary material" is intended to mean and to include all such things as rope, cord, wire rope, electrical wire, chain and other material of that general kind that is commonly supplied on reels having a core and a pair of opposed circular flanges.

The display and dispensing racks of the prior art suffer from a number of disadvantages.

First, in a rack which supports a plurality of reels upon a common axle, replacement of any one reel requires the removal of the axle from the stand so that the reel may be slid axially off the axle for removal. If an axle carries, for example, three or five such reels of filamentary material and one of the central reels is empty, the entire axle must be removed, one or more outer but still full reels must be removed in order to gain access to the empty reel. Such full reels are, quite frequently heavy with the result that a display stand may be left with one or more empty reels until personnel from the stockroom are available to replace the empty reel with a full reel. Such a practice, of course, results in lost sales and in customer dissatisfaction.

Second, a display stand which supports a plurality of reels upon one or more common axles makes no provision for neatly locating the free end of a filamentary material carried by the reel with the result that the assortment of ropes, wires and the like frequently hang down from the device in a tangled, disorderly array. This makes dispensing of the material awkward and presents an untidy appearance which is detrimental to the image presented by such users as a retail organization and, more importantly, may present a hazard both to store personnel and to transient customers.

Thirdly, display and dispensing racks of the prior art frequently make no provision for measuring the length of the filamentary material which is to be dispensed and sold. It is common practice in some retail organizations for the clerk to measure the length of a piece of rope, for example, by laying it out on the floor and using the twelve inch floor tiles as measuring units to determine the length of the material requested by a customer. Such measurements are frequently done in a rather sloppy and inaccurate fashion and, in order to ensure customer satisfaction, a request for a length of, say, ten feet of material is frequently met by cutting and selling a somewhat longer length for the ten-foot price. Such a practice, over a period of time, results in a significant loss of revenue to the detriment and disadvantage of the retail organization.

It is, accordingly, an object of the present invention to provide a display and dispensing rack for filamentary material in which the disadvantages enumerated above are overcome.

First, individual reels of filamentary material are supported by their flange edges upon roller bars so that any reel may be readily removed from the rack independently of any other reels. As a result, an empty reel can be readily removed and replaced by a full reel as soon as the contents of the reel have been exhausted.

The display and dispensing rack of the present invention provides a neat and tidy appearance, provides guides and locating apertures for the free ends of the material to be dispensed so that there is no tangle or hanging material and so that hazards to personnel and transient customers are avoided.

Thirdly, the display and dispensing rack of the present invention provides an integral counter and measuring device by means of which the requested length can be accurately measured and cut in a manner that avoids the hazardous practice of laying the material out on the floor and overcomes the inaccuracy inherent in that practice.

IN THE DRAWINGS

A preferred embodiment of the present invention is described in detail with reference to the accompanying drawings in which like reference numerals denote like parts in the various views and in which.

SPECIFIC DESCRIPTION

Figure 1:
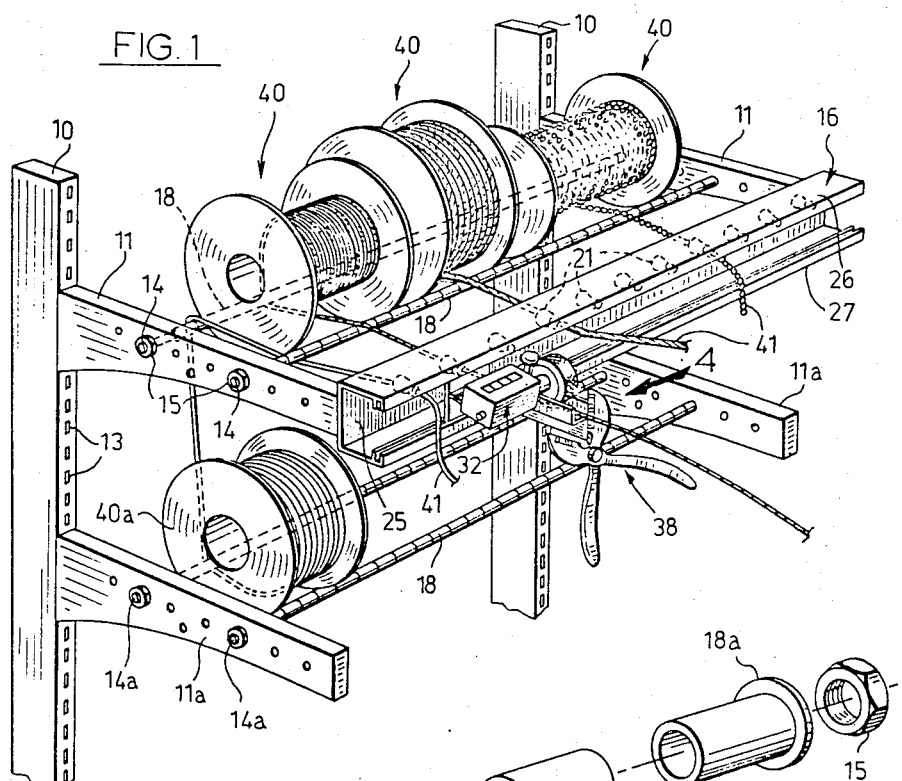
FIG. 1 is a perspective view of a typical display and dispensing rack constructed in accordance with the present invention.
Figure 5:
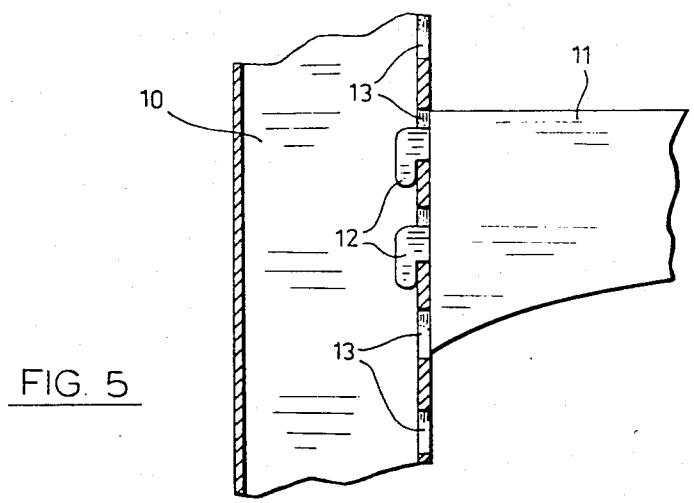
FIG. 5 is a small, detailed view showing a typical mounting arrangement for the rack on a frame member.

Turning now to FIG. 1, the display and dispensing rack of the present invention is shown as comprising a pair of conventional, vertical slotted standards 10, each of which supports at least one forwardly extending horizontal arm 11. Each arm 11 is provided with hooks 12 to engage the slots 13 in the standards 10 as is well known and as is illustrated in FIG. 5.

Extending between the arms 11 are at least two spaced, parallel rods 14 which pass through selected apertures in the arms 11 and which are secured in position by nuts 15.

Joining the ends of the arms 11 is a guide and cutter supporting bar 16.

As can be seen in FIG. 1, there may be more than one pair of arms 11 and a second pair such as 11a may be provided in order to support a further assortment of reels.

Figure 2:
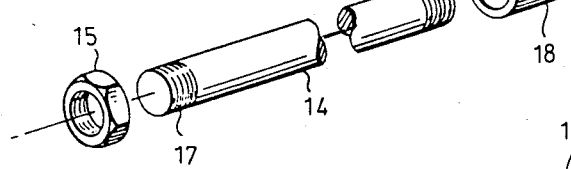
FIG. 2 is an exploded view of one of the roller bars of FIG. 1 to illustrate the construction.

Referring to FIG. 2, the rods 14, as can be seen, are threaded at each end at 17 to receive the retaining nuts 15 and carry a plurality of closely spaced, separate, short rollers 18 which are freely rotatable thereon. As seen in FIG. 1, the rollers 18 fully occupy the entire length of the rods 14 between the arms 11.

Figure 3:
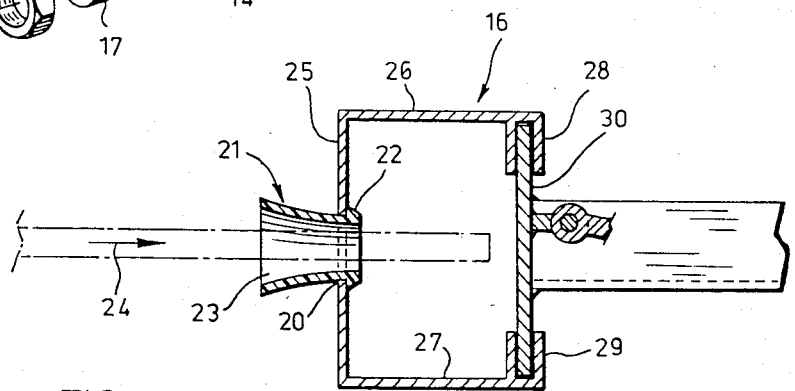
FIG. 3 is a view taken along line 3—3 of FIG. 1.

The guide and cutter supporting bar 16 is provided with a plurality of spaced apertures 20 (see FIG. 3) into which are pressed moulded plastic guide elements 21. The elements 21 may conveniently be provided with retaining lips 22 to hold them in position and are formed with a flared entrance passage 23 so as to enable the filamentary material to be readily passed therethrough in the direction of the arrow 24. The elements 21 avoid the abrasion of the filamentary material by the sharp edges of the apertures 20. In addition, the guide elements may be constructed so that the filamentary material can pass through only in the dispensing direction.

As seen in FIG. 1, there is a plurality of guide elements 21 in the guide and cutter supporting bar, only some of which are in use at any one time. The reason for supplying the numerous elements 21 is to accommodate filamentary material running from an assortment of reels of different sizes.

The guide and cutter supporting bar is, conveniently, a channel shaped member having a rear flange 25 which is secured to the forward ends of the arms 11 and upper and lower flanges 26 and 27. The forward edges of upper and lower flanges 27 are provided with inwardly facing grooved flanges 28 and 29 which are adapted to receive a plate 30 which may be slideable therealong so as to be positioned at any desired point along the length of the guide and cutter supporting bar 16.

Figure 4:
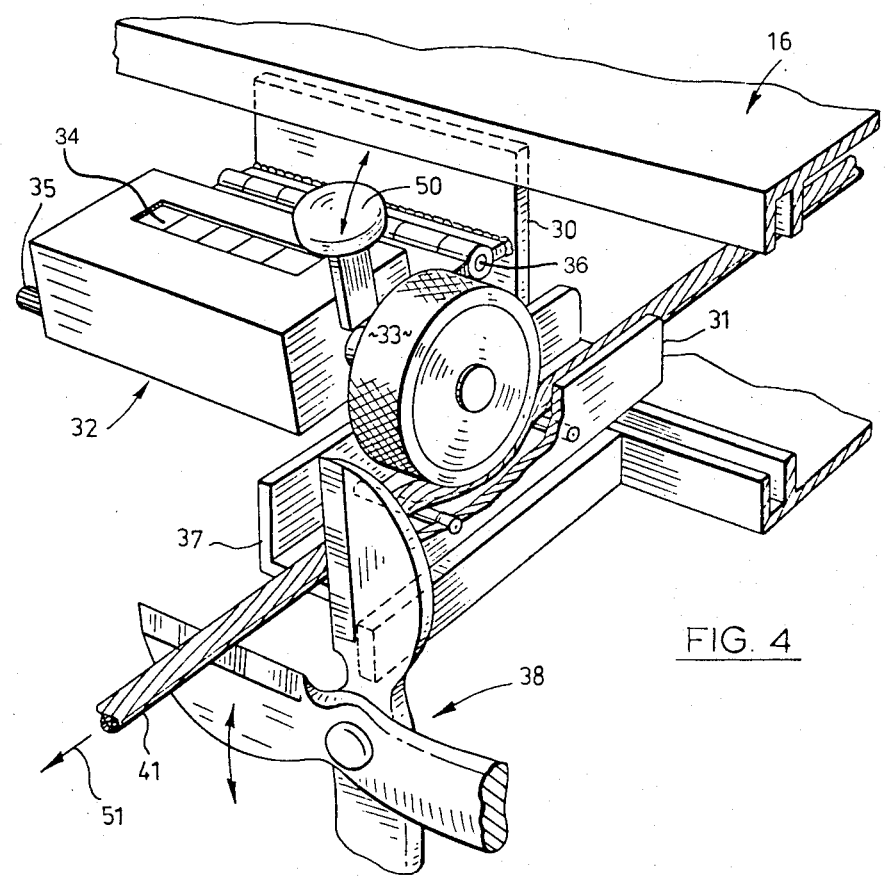
FIG. 4 is an enlarged perspective view of the counting and cutting apparatus illustrated in FIG. 1.

The plate 30, as seen in FIG. 4, carries an upwardly opening U-shaped channel 31 and a pivoted measuring or counter device 32. The counter device 32 is a conventional apparatus provided with a rubber surfaced roller 33, a digital counting dial 34 and a reset button 35.

The counting device 32 is pivotally mounted about pivot pin 36 and is spring loaded by means of a spring (not shown) so as to urge the rubber covered wheel 33 downwardly towards the bottom wall 37 of the channel member 31.

The end of the channel member 31 may, conveniently, have secured thereto a cutting device 38 located in such a position that it may sever material extending through the channel 31.

Turning now to FIGS. 1 and 4, the operation of the display and dispensing rack will be described in detail.

First, a plurality of reels 40 are placed on the roller rods 14 resting on the edges of their circular end flanges. It is to be noted that the spacing between adjacent, parallel rods 14 must be smaller than the diameter of the smallest reel which it is intended to use in association with the display and dispensing rack so that the rods will support the reels in the manner shown in FIG. 1.

The filamentary material from the reels is then led off the reel rearwardly and downwardly behind and beneath the rearward rod 14 and then forwardly towards the guide and cutter supporting bar, through the guide element 21 so that the free end 41 projects a short distance through the guide element and is visible and available to be grasped in order to dispense material from the reel.

In the event that a lower rack comprising arms 11a is employed, a further array of reels 40a may be carried by corresponding rods 14a and, in that event, the filamentary material is led off the reel below the rear rod 14a and upwardly over the rear rod 14 of the upper array and then forwardly and through the guide element 21 so as to present an end 41.

It will be noted that each reel 40 and 40a rests upon its flanges on the rollers 18 carried by the rods 14 and 14a. When the filamentary material is grasped and pulled, the reels will tend to rotate to dispense the material and this rotation will be facilitated by the rollers 18 on the rods 14. Only the rollers 18 in contact with the flanges of the reels, however, will rotate and, as a result, rotation of one reel will not induce rotation of other reels on the same array, As an alternative, it may be convenient to provide the rollers 18 with low radial flanges such as 18a shown in FIG. 2. With this construction, there will be no tendency for the reels 40 to migrate laterally along the rods 14 as the material is dispensed.

Turning now to FIG. 4, the end 41 of the filamentary material may be laid into the channel 31 by moving the handle 50 attached to the counter 32 towards the reels 40 against the action of the spring (not shown) so as to pivot it about the pivot pin 36. This will lift the rubber covered roller out of the channel 31 and permit the filamentary mateiral to be laid therein. When the handle is released, the roller 33 will assume the position shown in FIG. 4 in contact with the filamentary material so as to measure the length of material being withdrawn through the channel in the direction of the arrow 51 in FIG. 4.

When the desired length of material has been withdrawn as indicated by the digital counter 34, the cutter mechanism 38 can sever the material accurately and conveniently.

The counting and cutter assembly carried by the plate 30 is free to slide along the length of the guide and cutter supporting bar so as to position the channel 31 in front of a selected one of the guide elements 21 depending upon the filamentary material to be dispensed.

The upper surface of the upper flange 26 provides a convenient surface upon which to adhere labels to indicate the nature and price of the material issuing from the guide element immediately below.

As can be seen from the arrangement in FIG. 1, if, for example, the center reel of the upper row in FIG. 1 should become empty, it can simply be lifted off the rods 14 and replaced without disturbing either of the other reels.

From the preceding description, it can be seen that a display and dispensing rack has been provided which is free of the objections enumerated above with respect to the prior art.

In addition, at least two further and significant advantages are achieved. First, the reels resting on the roller bars do not display a tendency to rotate unless the filamentary material is being pulled deliberately. Thus, the likelihood that the contents of a reel will unintentionally unwind is eliminated. Second, by being able to conveniently measure and cut any desired length of material, a retailer no longer needs to follow the wasteful practice of keeping an inventory of pre-cut popular sizes of various materials.

The device illustrated in FIG. 1 may be arranged to embody any convenient number of pairs of forwardly extending arms 11 and rods 14 so as to support the desired number of reels. It is to be noted, however, that even where there are three or more pairs of arms 11 and rods 14, all the filamentary material may be led to the single guide and cutter supporting bar so that the ends of the material to be dispensed are presented at a single location to be measured by a single measuring and counting device and severed by the single cutting device. As an alternative, separate guide and cutter supporting bars may be used in association with separate arms 11, for example, when one pair of arms supports reels of rope and a second pair supports reels of wire.

Replacement of empty reels has been simplified, a neat and tidy array has been provided and accurate counting and measuring mechanisms have been associated with the device to avoid the difficulties of the prior art.

The preceding description is intended to illustrate a preferred embodiment of the present invention but minor modifications and variations are contemplated within the scope of the appended claims.

I claim:

1. A display and dispensing rack for reels of filamentary material comprising;
   a. an upright frame;
   b. a pair of spaced, forwardly projecting arms carried by the frame;
   c. a guide and cutter supporting bar joining the forward ends of the arms and provided with a plurality of spaced apertures through which the filamentary material is led from reels;
   d. at least two spaced, parallel rods extending between the arms at locations behind the guide and cutter bar and in front of the frame and spaced apart by a distance that is less than the flange diameter of the smallest reel from which filamentary material is to be dispensed;
   e. each of said rods carrying a plurality of closely spaced, separate, short rollers fully occupying the space between the arms and freely rotatable thereon, each short roller being provided with a radial flange adjacent at least one end.

* * * * *